(12) United States Patent
Maruyama

(10) Patent No.: US 10,013,562 B2
(45) Date of Patent: Jul. 3, 2018

(54) INFORMATION PROCESSING DEVICE, AND INFORMATION PROCESSING METHOD

(71) Applicant: NEC Corporation, Minato-ku, Tokyo (JP)

(72) Inventor: Yasunari Maruyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/769,856

(22) PCT Filed: Feb. 7, 2014

(86) PCT No.: PCT/JP2014/052897
§ 371 (c)(1),
(2) Date: Aug. 24, 2015

(87) PCT Pub. No.: WO2014/136525
PCT Pub. Date: Sep. 12, 2014

(65) Prior Publication Data
US 2016/0004872 A1    Jan. 7, 2016

(30) Foreign Application Priority Data
Mar. 6, 2013   (JP) .................... 2013-043820

(51) Int. Cl.
*G06F 21/00* (2013.01)
*G06F 21/60* (2013.01)
(Continued)

(52) U.S. Cl.
CPC .......... *G06F 21/60* (2013.01); *G06F 3/04817* (2013.01); *G06F 3/04842* (2013.01);
(Continued)

(58) Field of Classification Search
USPC ........................................... 726/26
See application file for complete search history.

(56) References Cited

U.S. PATENT DOCUMENTS

| | | | |
|---|---|---|---|
| 7,593,000 B1 | 9/2009 | Chin | |
| 2008/0177921 A1* | 7/2008 | Matsunagi | G06F 9/4812 710/260 |

(Continued)

FOREIGN PATENT DOCUMENTS

| | | |
|---|---|---|
| CN | 101467432 A | 6/2009 |
| JP | 2004215103 A | 7/2004 |

(Continued)

OTHER PUBLICATIONS

International Search Report for PCT Application No. PCT/JP2014/052897, dated May 13, 2014.

(Continued)

*Primary Examiner* — Jason T Lee

(57) ABSTRACT

An information processing device includes an interrupt information output request part configured to detect an input of interrupt information, which is information newly output with an output part and which includes a plurality of contents, when output information is being output with the output part. An output controller restricts the scope of the interrupt information being output with the output part based on the type of the output information. Thus, the information processing device is able to switch an operation as to whether or not to output personal information such as an incoming notice with the output part.

10 Claims, 10 Drawing Sheets

(51) Int. Cl.
*H04M 1/67* (2006.01)
*G06F 3/0481* (2013.01)
*G06F 3/0484* (2013.01)
*H04M 1/57* (2006.01)
*G06F 3/0488* (2013.01)

(52) U.S. Cl.
CPC ........ *G06F 3/04883* (2013.01); *H04M 1/576* (2013.01); *H04M 1/67* (2013.01)

(56) References Cited

U.S. PATENT DOCUMENTS

| | | | |
|---|---|---|---|
| 2008/0287103 A1* | 11/2008 | Itou | H04M 1/576 455/411 |
| 2009/0203363 A1 | 8/2009 | Isobe | |
| 2013/0207913 A1* | 8/2013 | Takashima | G06F 3/044 345/173 |

FOREIGN PATENT DOCUMENTS

| | | |
|---|---|---|
| JP | 2006211393 A | 8/2006 |
| JP | 2007274240 A | 10/2007 |
| JP | 2008177810 A | 7/2008 |
| JP | 2008288924 A | 11/2008 |
| JP | 2009260484 A | 11/2009 |
| JP | 2013046171 A | 3/2013 |

OTHER PUBLICATIONS

Extended European Search Report for EP Application No. EP14760150.4 dated Sep. 9, 2016.

Chinese Office Action for CN Application No. 201480012099.5 dated Mar. 1, 2017 with English Translation.

* cited by examiner

| NAME OF IMAGE | TYPE |
|---|---|
| A | 0 (RESTRICTIONS ON THE RANGE OF DISCLOSURE) |
| B | 1 (NO RESTRICTIONS ON THE RANGE OF DISCLOSURE) |
| C | 1 |
| D | 1 |
| E | 0 |
| F | 1 |
| G | 1 |
| H | 0 |
| ⋮ | ⋮ |

INFORMATION PROCESSING DEVICE, AND INFORMATION PROCESSING METHOD

This application is a National Stage Entry of PCT/JP2014/052897 filed on Feb. 7, 2014, which claims priority from Japanese Patent Application 2013-043820 filed on Mar. 6, 2013, the contents of all of which are incorporated herein by reference, in their entirety.

TECHNICAL FIELD

The present invention relates to an information processing device configured to limit output information, and an information processing method.

BACKGROUND ART

It is necessary to emphasize handling of personal information in information processing devices such as smart phones and tablet terminals; hence, those devices are equipped with functions of setting passwords such that they cannot be easily handled by other people.

Patent Literature Document 1 discloses a technology of setting modes to achieve security in information processing devices according to users' needs such that personal information such as incoming notices will not be leaked out due to the missing of information processing devices.

Patent Literature Document 2 discloses a technology of protecting personal information by preventing other images other than necessary images from being displayed on digital cameras (or electronic cameras), i.e. one type of information processing devices, when showing the images displayed on digital cameras with a number of unspecified people.

CITATION LIST

Patent Literature Document

Patent Literature Document 1: Japanese Patent Application Publication No. 2007-274240
Patent Literature Document 2: Japanese Patent Application Publication No. 2004-215103

SUMMARY OF INVENTION

Technical Problem

In the technologies disclosed in Patent Literature Documents 1 and 2, however, it is necessary to determine whether or not to display personal information such as incoming notices and images in connection with the setting of modes achieving security. In order to prevent personal information from being viewed by other people, it is necessary to set a non-display mode of not displaying incoming notices and images in advance. According to the technologies of Patent Literature Documents 1 and 2, it is necessary to change modes so as to compulsorily display personal information when users prefer to display personal information irrespective of the non-display setting of specific information; however, this may cause inconvenience by increasing the number of troublesome operations for users.

The present invention aims to provide an information processing device, an information processing method, and a program, which can solve the above problem.

Solution to Problem

To achieve the above object, the present invention is directed to an information processing device including: an interrupt information output request detector configured to detect the occurrence of interrupt information newly output with an output part when output information is being output with the output part; and an output controller configured to restrict the scope of the interrupt information being output with the output part based on the type of the output information.

The present invention is directed to an information processing method of detecting the occurrence of interrupt information newly output with an output part when output information is being output with the output part, and of restricting a scope of the interrupt information being output with the output part based on the type of the output information.

The present invention is directed to a non-transitory computer-readable storage media storing a program causing a computer to implement an information processing method comprising the steps of: detecting the occurrence of interrupt information newly output with an output part when output information is being output with the output part; and restricting the scope of the interrupt information being output with the output part based on the type of the output information.

Advantageous Effects of Invention

According to the present invention, it is possible to switch an operation whether or not to output personal information such as incoming notices depending on an output identifier currently output with an output part irrespective of any mode being currently set up.

DESCRIPTION OF EMBODIMENTS

Figure 1:
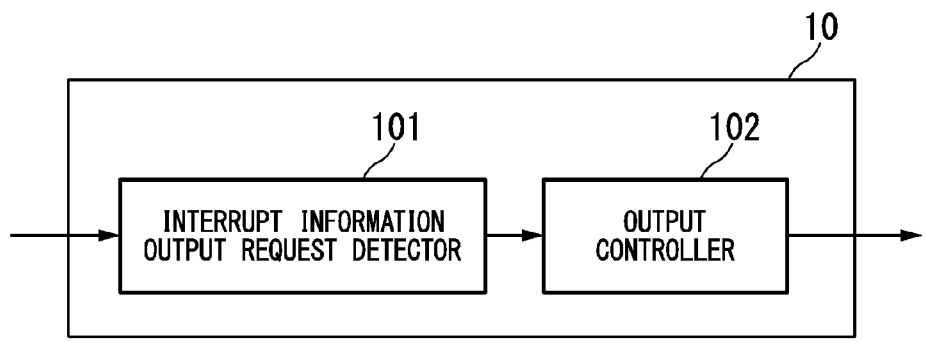
FIG. 1 is a block diagram showing a main part of an information processing device according to the present invention.

FIG. 1 is a functional block diagram showing the minimum configuration of an information processing device 10 according to the embodiment of the present invention.

As shown in FIG. 1, the information processing device 10 of the present invention includes functional blocks of at least an interrupt information output request detector 101 and an output controller 102.

The interrupt information output request detector 101 is a functional block configured to detect the input (or occurrence) of interrupt information which is newly output with the output part while output information is output with the output part.

The output controller 102 is a functional block configured to limit the output content of the interrupt information output with the output part based on the type of output information.

For example, the functional blocks such as the interrupt information output request detector 101 and the output controller 102 can be embodied using control programs executed with the controller of the information processing device 10 (e.g. CPU: Central Processing Unit).

First Embodiment

Figure 2:
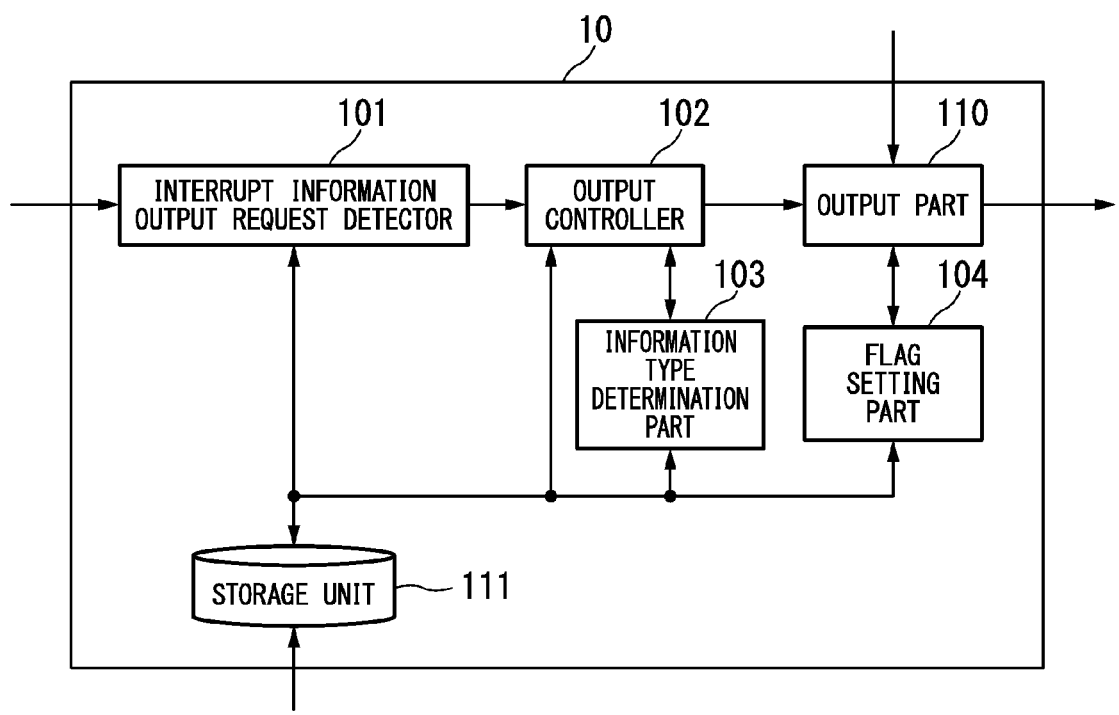
FIG. 2 is a block diagram showing an information processing device according to the first embodiment of the present invention.

FIG. 2 is a functional block diagram showing the configuration of the information processing device 10 according to the first embodiment of the present invention.

As shown in FIG. 2, the information processing device 10 of the first embodiment further includes an information type determination part 103, a flag setting part 104, an output part 110, and a storage unit 111 in addition to the minimum configuration of the information processing device 10 shown in FIG. 1.

The information type determination part 103 is a functional block configured to determine the type of the information being output with the output part 110 by the output control part 102.

The flag setting part 104 is a functional block configured to correlate a flag, representing the type having restrictions on the range of disclosure, to the output information based on a user's input.

The output part 110 is an output part configured to output various pieces of information under the control of the output controller 102. For example, the output part 110 is a screen configured to display video, such as a liquid crystal display and an organic EL (Electro-Luminescence) display, or a speaker configured to produce sound; hence, it is possible to employ any types of output parts which can appropriately convey the output information via the five senses of humans.

The storage unit 111 is a storage unit configured to store various pieces of information necessary for the operation of the information processing device 10.

The output controller 102 is a functional block configured to output the simple information due to restrictions on the range of disclosure concerning the interrupt information including a plurality of output contents in connection with the output information of the type indicating no restrictions on the range of disclosure. The output controller 102 is a functional block configured to output each type of the output information while facilitating easy understanding about the range of disclosure based on flags.

For example, the functional blocks such as the interrupt information output request detector 101, the output controller 102, the information type determination part 103, and the flag setting part 104 can be embodied using control programs executed with the controller (e.g. CPU) of the information processing device 10.

It is possible for the information processing device 10 of the foregoing embodiment to further include other functional blocks in addition to the above functional blocks.

Figure 3:
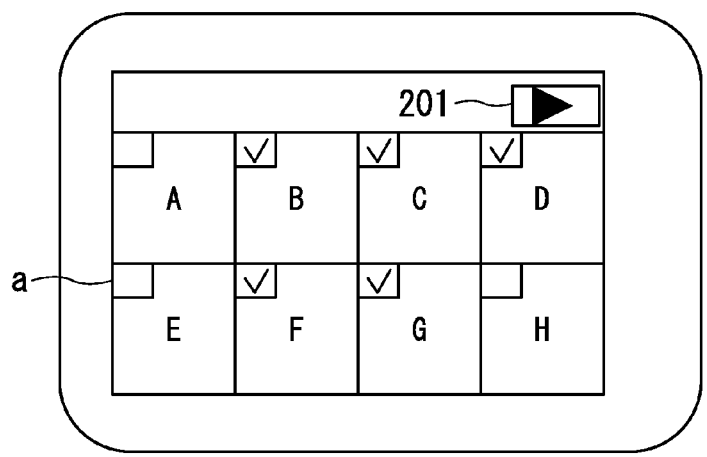
FIG. 3 is a plan view showing an example of types of output information being output with an output part shown in FIG. 2.

FIG. 3 is a schematic drawing showing an example of images output with the output part 110 when each user designates the type of output information.

FIG. 3 shows the letters A to H indicating various types of output information being output with the output part 110, wherein those letters A to H indicate images. In this case, the output part 110 is a display.

A select display box "a" shown in the upper-left corner in each of images A-H indicates a setting status about the range of disclosure concerning the output information (images). For example, each user may input output information by tapping blocks of B, C, D, F, and G among the displayed images in FIG. 3, thus selecting an image having no restrictions on the range of disclosure. Next, when each user taps a displayed icon 201 shown in FIG. 3, the output controller 102 displays a mark "V", indicating an image having no restrictions on the range of disclosure, in the select display box "a" of the output part 110 in connection with the blocks B, C, D, F, and G selected by each user.

Figure 4:
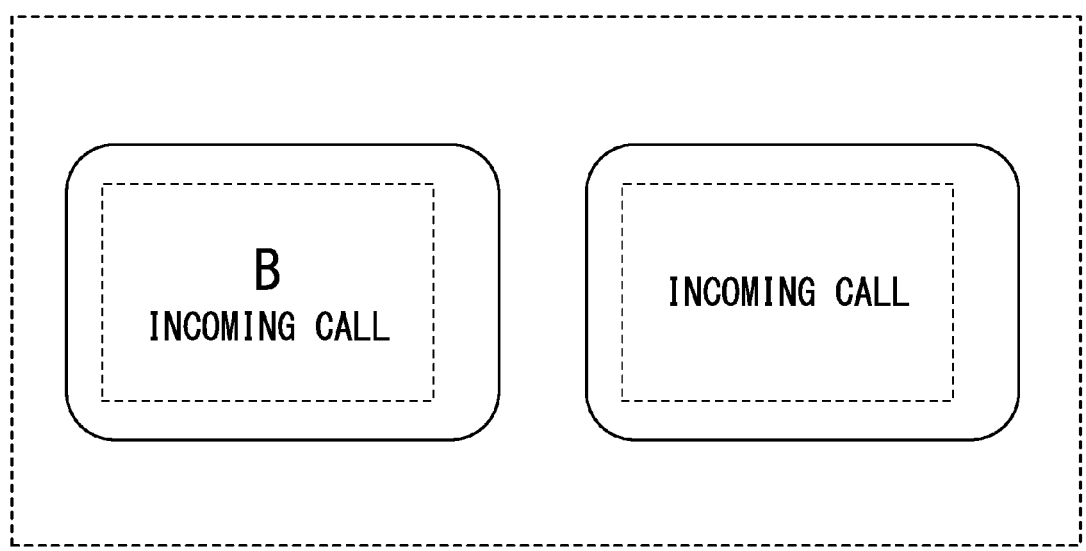
FIG. 4 is a plan view showing an example of interrupt information displayed when images having no restrictions on the range of disclosure are output with the output part shown in FIG. 2.

FIG. 4 shows an example of displaying interrupt information upon receiving an incoming notice while an image having no restrictions on the range of disclosure is being output with the output part 110.

FIG. 4 shows a user's operation to output an image B. The image B is an image having no restrictions on the range of disclosure. Upon receiving interrupt information on this condition, the output controller 102 displays an interrupt message such as "incoming call", not including any information such as the name of an originator and a telephone number, in order to prevent personal information, i.e. the detailed information of an originator, from being viewed by other people.

The output controller 102 displays borders to identify the range of disclosure such that the border of the output part 110 is displayed using a thin dotted line or a red line when an image having no restrictions on the range of disclosure is output with the output part 110, or the border of the output part 110 is displayed using a bold solid line or a blue line when an image having restrictions on the range of disclosure is output with the output part 110.

In this connection, the output controller 102 may display an incoming notice, instead of the image B, with the output part 110.

Figures 5, 6:
FIG. 5 is a plan view showing an example of interrupt information displayed when images having restrictions on the range of disclosure are output with the output part shown in FIG. 2.
FIG. 6 shows an example of a data table describing the relationship between output information and flags representing the range of disclosure concerning the output information in a storage unit shown in FIG. 2.

FIG. 5 shows an example of interrupt information displayed on a phone receiving an incoming notice when an image having restrictions on the range of disclosure is output with the output part 110.

As shown in FIG. 5, the information processing device 10 determines that a single user may watch an image A, i.e. an image having restrictions on the range of disclosure, currently being output with the output part 110, and therefore the output controller 102 reads the detailed information of an originator such as the name of an originator and a telephone number, e.g. the information reciting "an incoming call from OO-san" and "090 XXXX XXXX", from the storage unit 111 so as to output the information to the output part 110 since there is no problem in displaying the detailed information of an originator for a person currently watching the image A. Additionally, the output controller 102 may register a facial photograph, stored in the storage unit 111, in an address book in advance, and therefore the output controller 102 may display the facial photograph of an originator with the output part 110 in order to easily identify an originator upon receiving an incoming call.

To display an image having restrictions on the range of disclosure with the output part 110, the output controller 102 may adopt a different manner of displaying the border of the output part 110 using a bold solid line or a blue line than other images, having no restrictions on the range of disclosure, displayed with the output part 110. Thus, it is possible to easily determine operations by changing the number of fingers among an operation to show images with other people and an operation to view images with a single user.

FIG. 6 shows an example of a data table, stored in the storage unit 111, representing the relationship between output information and flags indicating the range of disclosure concerning the output information.

An example of the data table shown in FIG. 6 is determined in connection with an example of the output information shown in FIG. 3 in which each user may set and input the range of disclosure concerning each image; hence, the data table stores flags representing the type having restrictions on the range of disclosure, in connection with output information. In the data table, the images A, E, and H are stored in the storage unit 111 in connection with a flag "0" representing the type having restrictions on the range of disclosure. In the data table, the images B, C, D, F, and G are stored in the storage unit 111 in connection with a flag "1" representing the type having no restrictions on the range of disclosure.

Figure 7A:
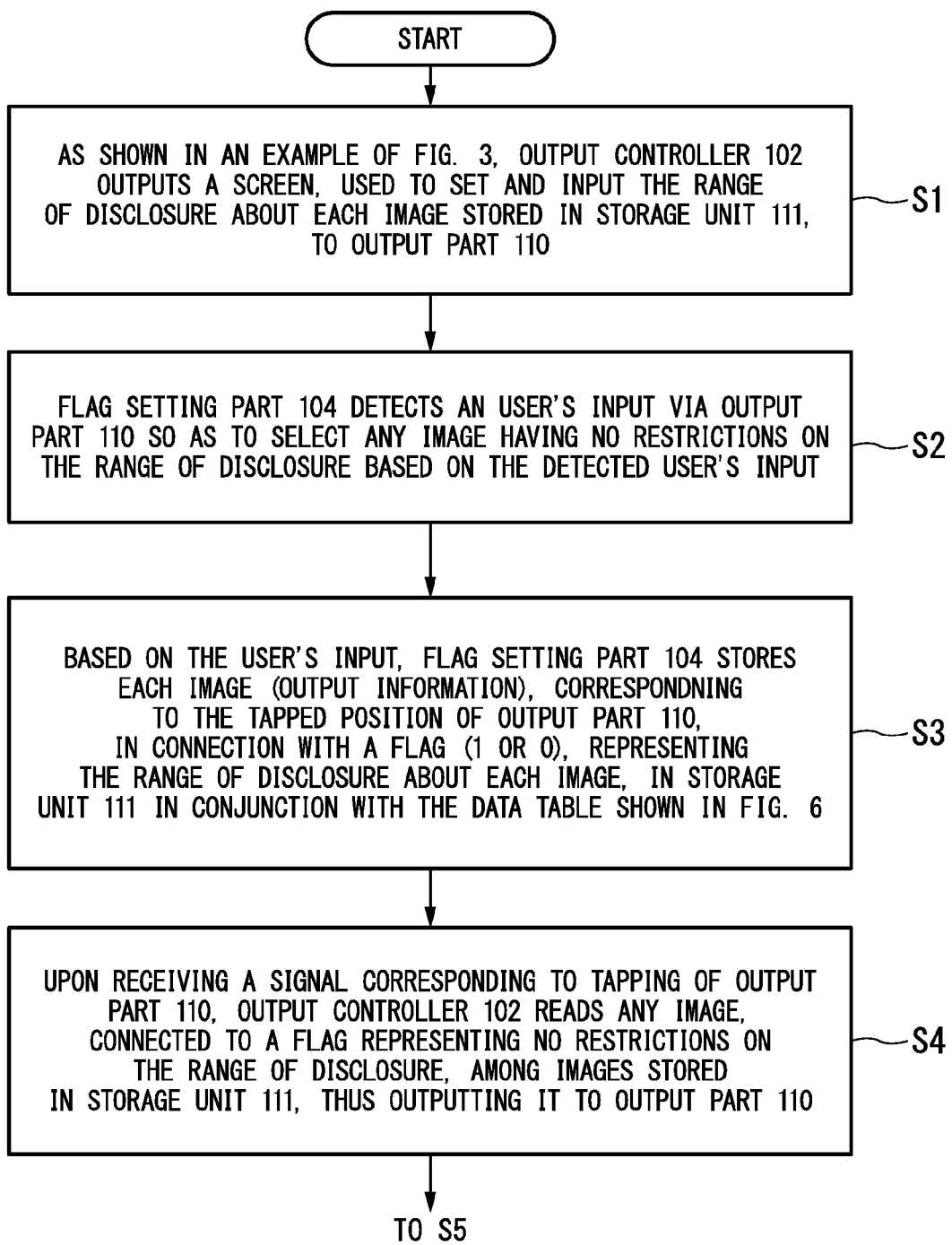
FIG. 7A is a flowchart showing the processing of the information processing device according to the first embodiment of the present invention.
Figure 7B:
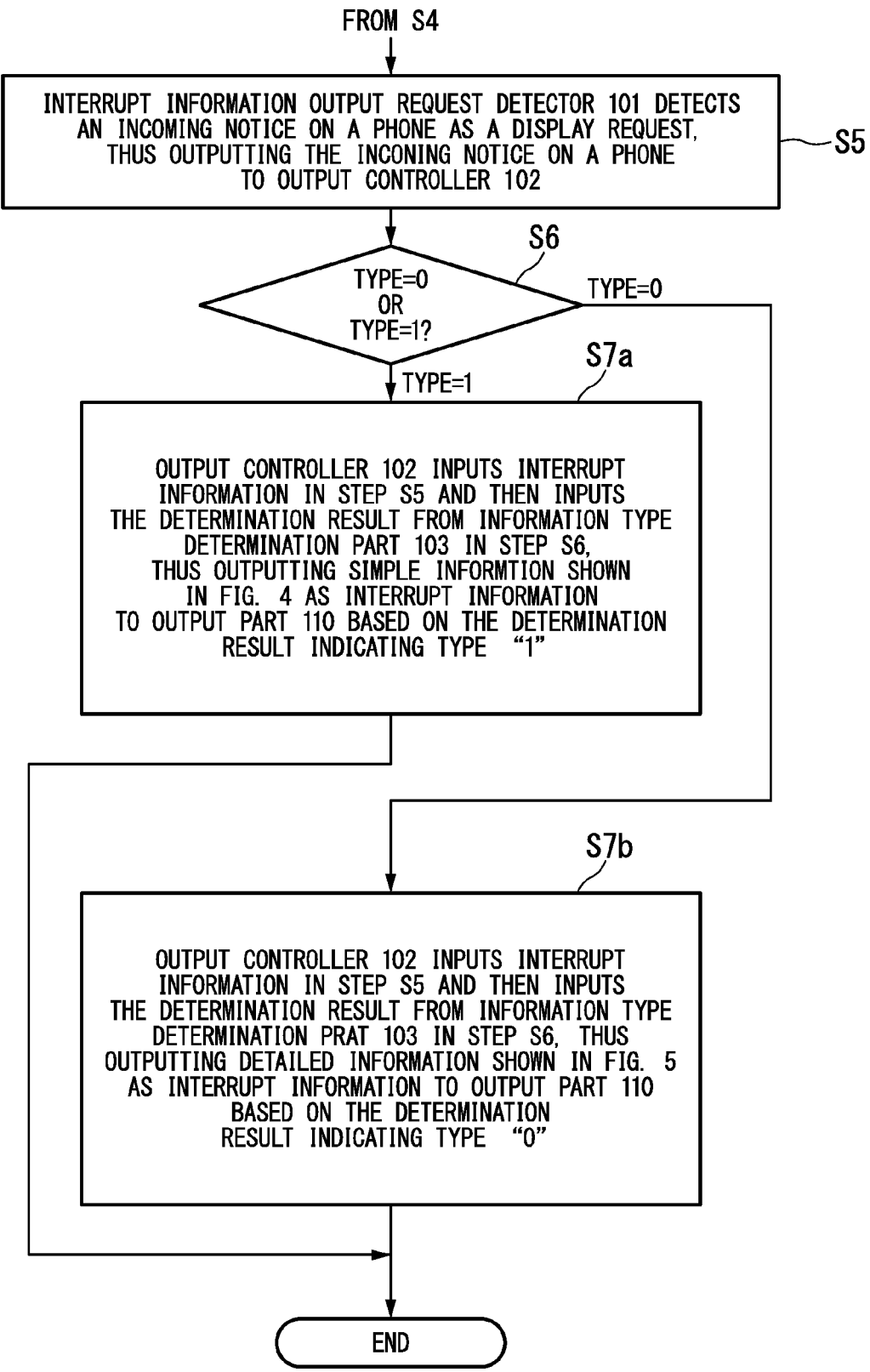
FIG. 7B is a flowchart showing the processing of the information processing device according to the first embodiment of the present invention.

FIGS. 7A and 7B are flowcharts showing the processing flow of the information processing device 10 according to the first embodiment of the present invention.

Next, the processing flow of the information processing device 10 of the first embodiment will be described with respect to the case where the information processing device 10 outputs the interrupt information with the output part 110 based on the type of output information. In the following description, the information processing device 10 outputs images as the output information with the output part 110.

First, each user may take images as the output information with a camera so as to store those images in the storage unit 111.

Alternatively, each user may obtain images, taken by other people such as friends, as the output information so as to store those images in the storage unit 111. In this connection, a storage unit used to store the output information is not necessarily limited to the storage unit 111; hence, it is possible to employ any types of storage units, which can be installed inside or outside the information processing device 10 and with which the information processing device 10 can read or write the output information.

Next, the output controller 102 outputs a screen, which is used to set and input the range of disclosure concerning each image stored in the storage unit 111 as shown in FIG. 3, with the output part 110 (step S1). When all the images stored in the storage unit 111 cannot be collectively displayed within the output part 110, it is possible to carry out a screen feed-forward function enabling all the images to be displayed using multiple screens. Alternatively, it is possible to carry out a scroll function enabling all the images to be displayed using scrolled screens.

Next, each user may input an operation by tapping images corresponding to the output information being output with the output part 110, thus selecting any images having no restrictions on the range of disclosure. When each user inputs an operation on images being output with the output part 110, the flag setting part 104 detects a user's input via the output part 110, thus selecting any images having no restrictions on the range of disclosure based on the detected user's input (step S2). As shown in the data table of FIG. 6, the flag setting part 104 stores images (i.e. output information), corresponding to the tapped positions of the output part 110, in the storage unit 111 in connection with flags (1 or 0) indicating the range of disclosure concerning each image based on the user's input (step S3).

Next, each user may tap the display icon 201 output with the output part 110 on the condition that the storage unit 111 stores some images. Upon receiving a signal corresponding to the user's tapping from the output part 110, the output controller 102 reads an image connected to a flag, indicating no restrictions on the range of disclosure, among images stored in the storage unit 111, so as to output the image to the output part 110 (step S4). Specifically, when each user taps the display icon 201, the output controller 102 firstly reads the image B, connected to the flag "1" indicating no restrictions on the range of disclosure, from the storage unit 111 so as to output the image B to the output part 110 with reference to the data table of FIG. 6 in which the images B, C, D, F, and G are each connected to the flag "1" indicating the type having no restrictions on the range of disclosure. Next, when each user carries out a user's operation to tap the image B displayed in the output part 110 twice, for example, the output controller 102 reads the image C, connected to the flag "1" having no restrictions on the range of disclosure, so as to output the image C to the output part 110. Similarly, every time each user repeats twice tapping on each image displayed in the output part 110, the output controller 102 sequentially outputs the images D, F, and G, connected to the flag "1" indicating no restrictions on the range of disclosure, to the output part 110 as long as twice tapping is repeated.

The interrupt information output request detector 101 detects an incoming notice as a display request so as to output the incoming notice to the output controller 102 (step S5).

When the interrupt information output request detector 101 detects the interrupt information, the information type determination part 103 determines the type of an image output with the output part 110 so as to determine whether the type is "0" or "1", thus outputting the determination result to the output controller 102 (step S6). Thus, the output controller 102 inputs the interrupt information in step S5 and then inputs the determination result from the information type determination part 103, and therefore the output controller 102 outputs the interrupt information to the output part 110 based on the type indicated by the determination result (step S107).

Herein, an assumption is made that the information processing device 10 receives an incoming call while the output controller 102 outputs the image B, connected to the type "1" indicating no restrictions on the range of disclosure, to the output part 110. In this case, when the interrupt information output request detector 101 detects the interrupt information, the information type determination part 103 determines the type of the image B, output with the output part 110, so as to output the determination result, specifying the type "1" (indicating no restrictions on the range of disclosure), to the output controller 102 (step S6). Thus, the output controller 102 inputs the interrupt information in step S5 and then inputs the determination result from the information type determination part 103 in step S6, and therefore the output controller 102 outputs the interrupt information, based on the determination result indicating the type "1", to the output part 102 in the form of the simple information shown in FIG. 4 (step S7).

Herein, an assumption is made that the information processing device 10 receives an incoming call when the output controller 102 outputs the image A, connected to the type "0" indicating restrictions on the range of disclosure, to the output part 110. In this case, when the interrupt information output request detector 101 detects the interrupt information, the information type determination part 103 determines the type of the image A, output with the output part 110, so as to output the determination result, specifying the type "0" (indicating restrictions on the range of disclosure), to the output controller 102. Thus, the output controller 102 inputs the interrupt information in step S5 and then inputs the determination result from the information type determination part 103 in step S6, and therefore the output controller 102 outputs the interrupt information, based on the determination result specifying the type "0", to the output part 110 in the form of the detailed information shown in FIG. 5 (step S7b).

As described above, the information processing device 10 according to the first embodiment of the present invention is able to switch an operation as to whether or not to output personal information such as incoming notices based on identifiers currently output with the output part 110 irrespective of the setting of modes.

Second Embodiment

Figure 8:
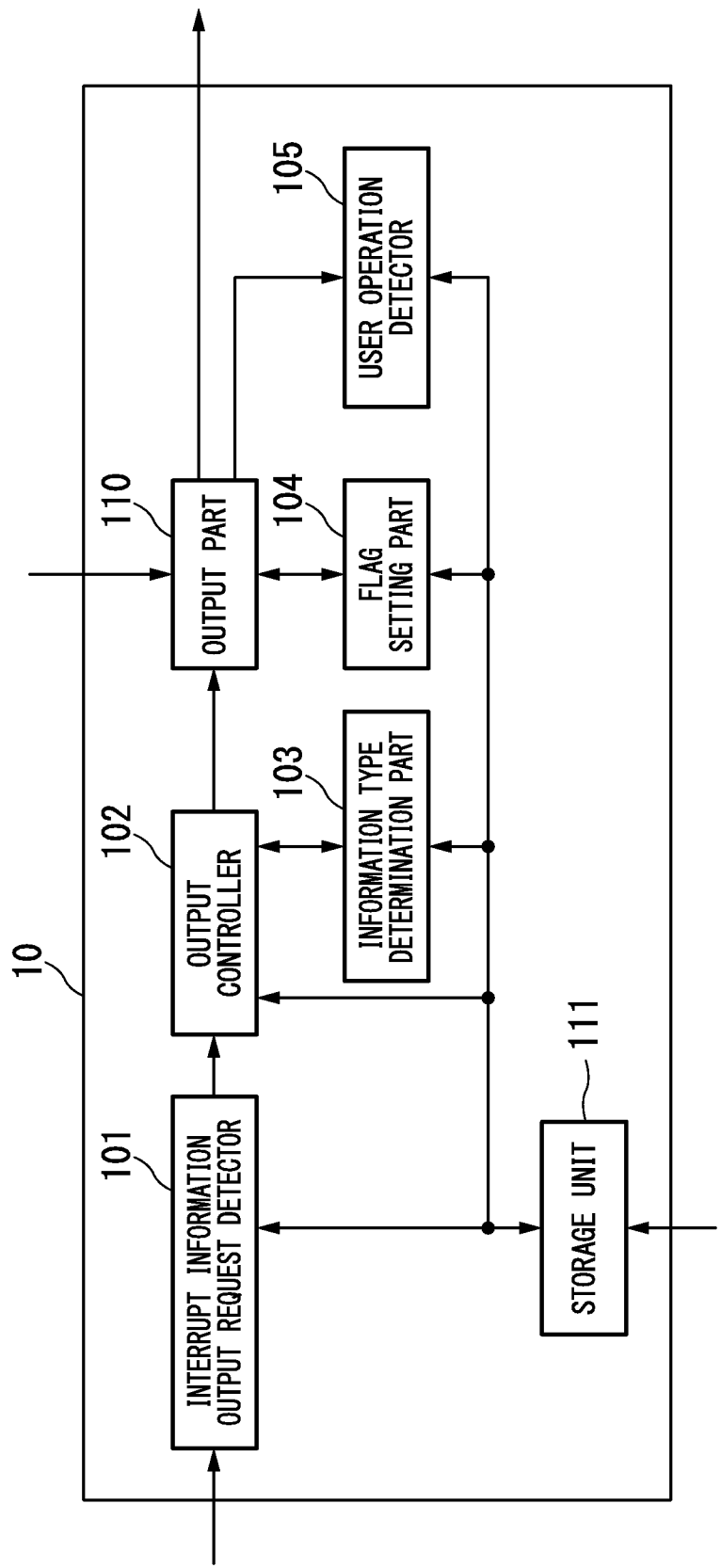
FIG. 8 is a block diagram showing an information processing device according to the second embodiment of the present invention.

FIG. 8 is a functional block diagram showing the configuration of the information processing device 10 according to the second embodiment of the present invention.

As shown in FIG. 8, the information processing device 10 of the second embodiment further includes a user operation detector 105 in addition to the foregoing functions of the information processing device 10 of the first embodiment shown in FIG. 2.

The user operation detector 105 detects the predetermined user's operation based on a user's input using the arbitrary number of fingers (e.g. two fingers) other than the predetermined number of fingers (e.g. one finger) or a user's input using the arbitrary number of objects (e.g. two pens or a pen able to concurrently touch two positions) other than the predetermined number of objects, whose number can be identified, (e.g. one pen).

Herein, an assumption is made that the information processing device 10 can be operated using a single finger of each user or a single object such as a touch pen based the setting using the exclusive application program. When each user operates the information processing device 10 by use of objects or fingers except for one finger while the output controller 102 outputs the output information, having no restrictions on the range of disclosure, to the output part 110, the output controller 102 may output the output information, which has restrictions on the range of disclosure and which cannot be output to the output part 110, to the output part 110.

For example, the foregoing functional blocks such as the interrupt information output request detector 101, the output controller 102, the information type determination part 103, the flag setting part 104, and the user operation detector 105 are embodied using control programs being executed with the controller (e.g. CPU) of the information processing device 10.

Additionally, the information processing device 10 of the present embodiment may further include other functional blocks in addition to the foregoing functional blocks.

Figure 9A:
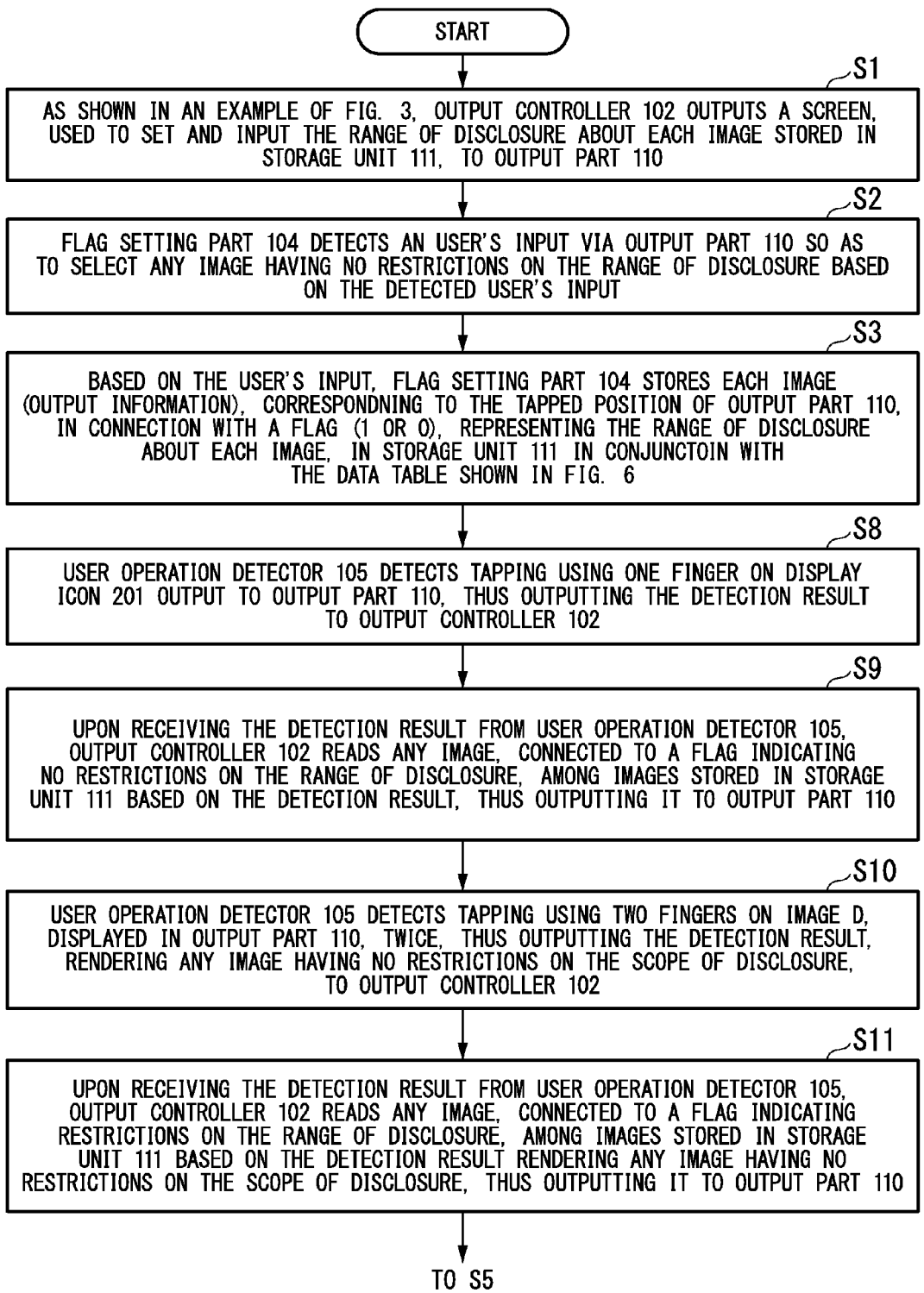
FIG. 9A is a flowchart showing the processing of the information processing device according to the second embodiment of the present invention.
Figure 9B:
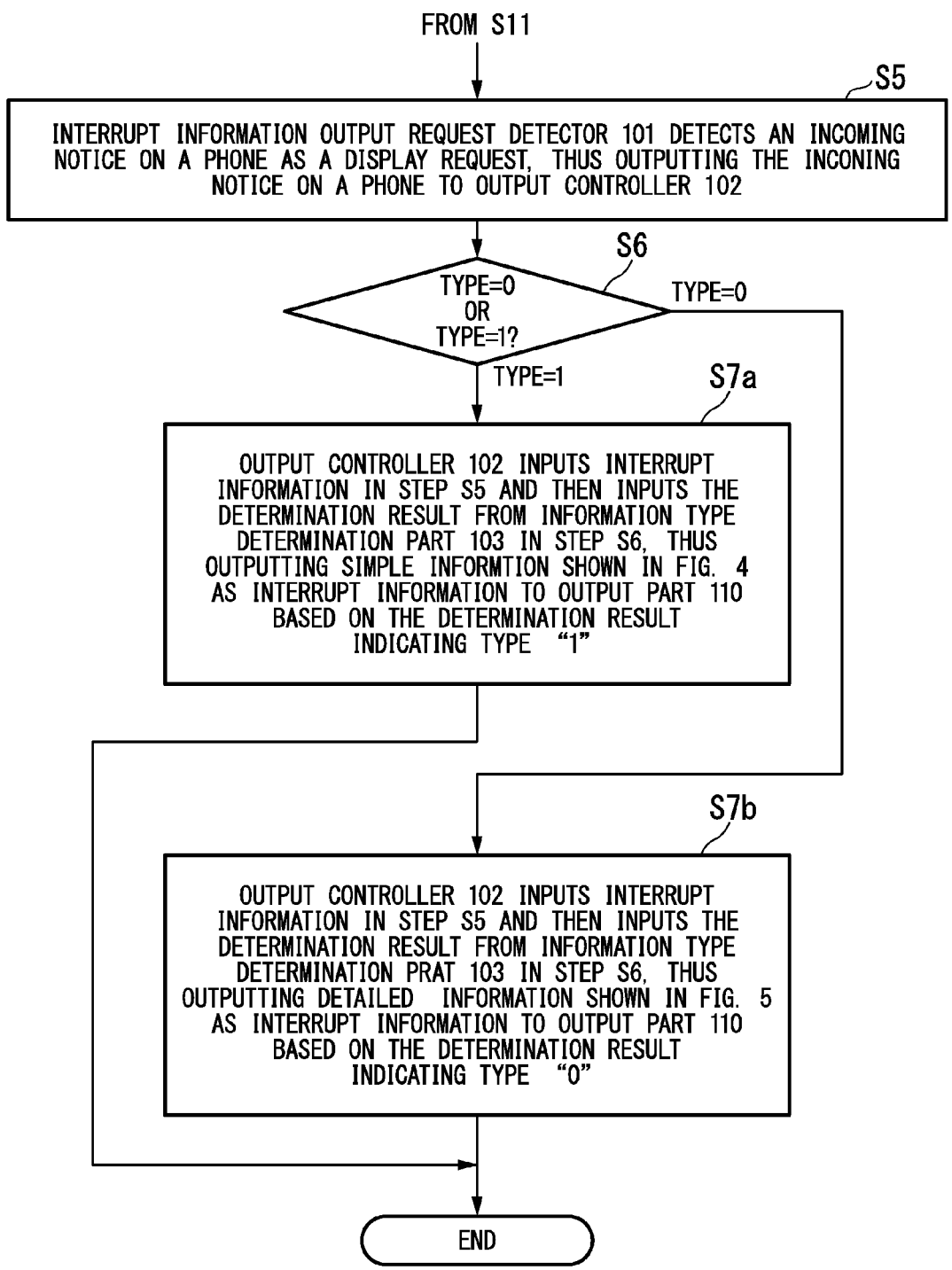
FIG. 9B is a flowchart showing the processing of the information processing device according to the second embodiment of the present invention.

FIGS. 9A and 9B are flowcharts showing the processing flow of the information processing device 10 according to the second embodiment of the present invention.

The processing flow of the information processing device 10 of the second embodiment will be described with respect to the case where the information processing device 10 outputs the interrupt information to the output part 110 based on the type of output information. In the following description, the information processing device 10 will output images as the output information to the output part 110.

Herein, an assumption is made that the output controller 102 may output the output information, having no restrictions on the range of disclosure, to the output part 110 when the information processing device 10 is operated based on the predetermined user's operation using one finger or one object such as a touch pen. Alternatively, an assumption is made that the output controller 102 may output the output information, having restrictions on the range of disclosure, to the output part 110 when the information processing device 10 is operated based on a user' operation, using objects or fingers except for one finger, different from the predetermined user's operation.

First, each user may take images as the output information so as to store those images in the storage unit 111.

Alternatively, each user may obtain images, which are taken by other people such as friends other than each user, as the output information so as to store those images in the storage unit 111.

As shown in an example of the output information shown in FIG. 3, the output controller 102 outputs a screen, used to set and input the range of disclosure concerning each image stored in the storage unit 111, to the output part 110 (step S1).

Then, each user may input a user's operation using tapping on images serving as the output information output with the output part 110, thus selecting any image having no restrictions on the range of disclosure. Owing to a user's input on images output with the output part 110, the flag setting part 104 detects the user's input via the output part 110 so as to select any image having no restrictions on the range of disclosure based on the detected user's input (step S2). At this time, the flag setting part 104 stores images (i.e. output information), corresponding to the tapped positions of the output part 110, in connection with flags (1 or 0), indicating the range of disclosure concerning each image, with the storage unit 111 in the form of the data table shown in FIG. 6 (step S3).

Next, each user may tap the display icon 201, which is output with the output part 110 as shown in FIG. 3, with one finger on the condition that various images are stored in the storage unit 111. Subsequently, the user operation detector 105 detects that the display icon 201 output with the output part 110 is tapped using one finger, thus outputting the detection result to the output controller 102 (step S8). Upon receiving the detection result from the user operation detector 105, the output controller 102 reads any image, connected to flags indicating no restrictions on the range of disclosure, among images stored in the storage unit 111, thus outputting it to the output part 110 (step S9). When each user taps the display icon 201 on the condition that the images B, C, D, F, and G are of types connected to flags "1", indicating no restrictions on the range of disclosure, on the data table shown in FIG. 6, for example, the output controller 102 reads the image B, connected to a flag "1" indicating no restrictions on the range of disclosure, from the storage unit 111 so as to output the image B to the output part 110. Next, when each user taps the image B, displayed in the output part 110, twice with one finger, the output controller 102 reads the image C, connected to a flag "1" indicating no restrictions on the range of disclosure, so as to output the image C to the output part 110. Next, when each user taps the image C, displayed in the output part 110, twice with one finger, the output controller 102 reads the image D, connected to a flag "1" indicating no restrictions on the range of disclosure, so as to output the image D to the output part 110.

Now, each user may tap the image D, displayed in the output part 110, twice with two fingers.

Subsequently, the user operation detector 105 detects that the image D displayed in the output part 110 is tapped twice with two fingers, thus outputting the detection result rendering any image having no restrictions on the scope of disclosure to the output controller 102 (step S10). Upon receiving the detection result from the user operation detector 105, the output controller 102 reads any image, connected to flags indicating restrictions on the range of disclosure, among images stored in the storage unit 111 based on the detection result rendering any image having no restrictions on the scope of disclosure, thus outputting it to the output part 110 (step S11). Herein, an assumption is made that the output controller 102 outputs the image D to the output part 110 on the condition that the images B, C, D, F, and G are connected to flags "1", indicating no restrictions on the range of disclosure, on the data table shown in FIG. 6. When each user taps the image D, displayed in the output part 110, twice with two fingers, the output controller 102 reads the image E, connected to a flag "0" indicating restrictions on the range of disclosure, so as to output the image E to the output part 110. Next, when each user taps the image E, displayed in the output part 110, twice with two fingers, the output controller 102 reads the image H, connected to a flag "0" indicating restrictions on the range of disclosure, so as to output the image H to the output part 110.

An assumption is made that the information processing device 10 receives an incoming notice when the output controller 102 outputs the image H, connected to a flag "0" indicating restrictions on the range of disclosure, to the output part 110.

At this time, the interrupt information output request detector 101 detects an incoming notice as a display request so as to output the incoming notice to the output controller 102 (step S5).

When the interrupt information output request detector 101 detects the interrupt information, the information type determination part 103 determines the type of an image output with the output part 110, thus outputting the determination result, specifying the type of either "0" or "1", to the output controller 102 (step S6). Thus, the output controller 102 inputs the interrupt information in step S5 and then inputs the determination result from the information type determination part 103 in step S6, and therefore the output controller 102 outputs the interrupt information to the output part 110 based on the determination result specifying the type of an image (step S7).

In step S8 of the above processing flow, when each user makes a user's operation using fingers except for one finger, the user operation detector 105 outputs the detection result rendering any image, e.g. personal information, having no restrictions on the scope of disclosure to the output controller 102. Upon receiving the detection result from the user operation detector 105, the output controller 102 reads any image, connected to flags indicating restrictions on the range of disclosure, among images stored in the storage unit 111 based on the detection result rendering any image having no restrictions on the scope of disclosure, thus outputting it to the output part 110.

The present embodiment is described such that the user operation detector 105 detects the predetermined user's operation based on a user's input using the arbitrary number of fingers larger than the predetermined number of fingers or a user's input using the arbitrary number of objects larger than the predetermined number of objects whose number can be identified.

In contrast, the user operation detector 105 may display any image having no restrictions on the scope of disclosure based on a user's input using the arbitrary number of fingers larger than the predetermined number of fingers or a user's input using the arbitrary number of objects larger than the predetermined number of objects whose number can be identified. Alternatively, the user operation detector 105 may display any image having no restrictions on the scope of disclosure based on a user's input using the arbitrary number of fingers smaller than the predetermined number of fingers or a user's input using the arbitrary number of objects smaller than the predetermined number of objects whose number can be identified.

For example, when the user operation detector 105 detects the predetermined user's operation based on a user's input using the arbitrary number of fingers larger than the predetermined number of fingers which is set to two, the user operation detector 105 determines that a user's input is made using the predetermined number of fingers even when each user uses three or more fingers. When the user operation detector 105 detects the predetermined user's operation based on a user's input using the arbitrary number of fingers smaller than the predetermined number of fingers which is set to two, the user operation detector 105 determines that a user's input is made using the predetermined number of fingers even when each user uses one finger.

As described above, the information processing device 10 according to the second embodiment of the present invention is able to display any image including personal information having no restrictions on the scope of disclosure based on a user's operation different from the predetermined user's operation irrespective of the setting of modes.

Third Embodiment

The configuration of the information processing device 10 of the third embodiment is identical to the configuration of the information processing device 10 of the second embodiment (FIG. 8) which is able to display any image including personal information having no restrictions on the scope of disclosure based on a user's operation different from the predetermined user's operation, but the user operation detector 105 has a different function.

The user operation detector 105 is a functional block configured to detect the predetermined user's operation based on a user's input using the predetermined number of fingers or a user's input using the predetermined number of objects whose number can be identified. In order to output the output information having no restrictions on the range of disclosure to the output part 110, for example, the information processing device 10 is set to be operated using one finger of each user or one object such as a touch pen. To output the output information having restrictions on the range of disclosure to the output part 110, the information processing device 10 is set to be operated using two fingers of each user or two positions of each object.

Figure 10A:
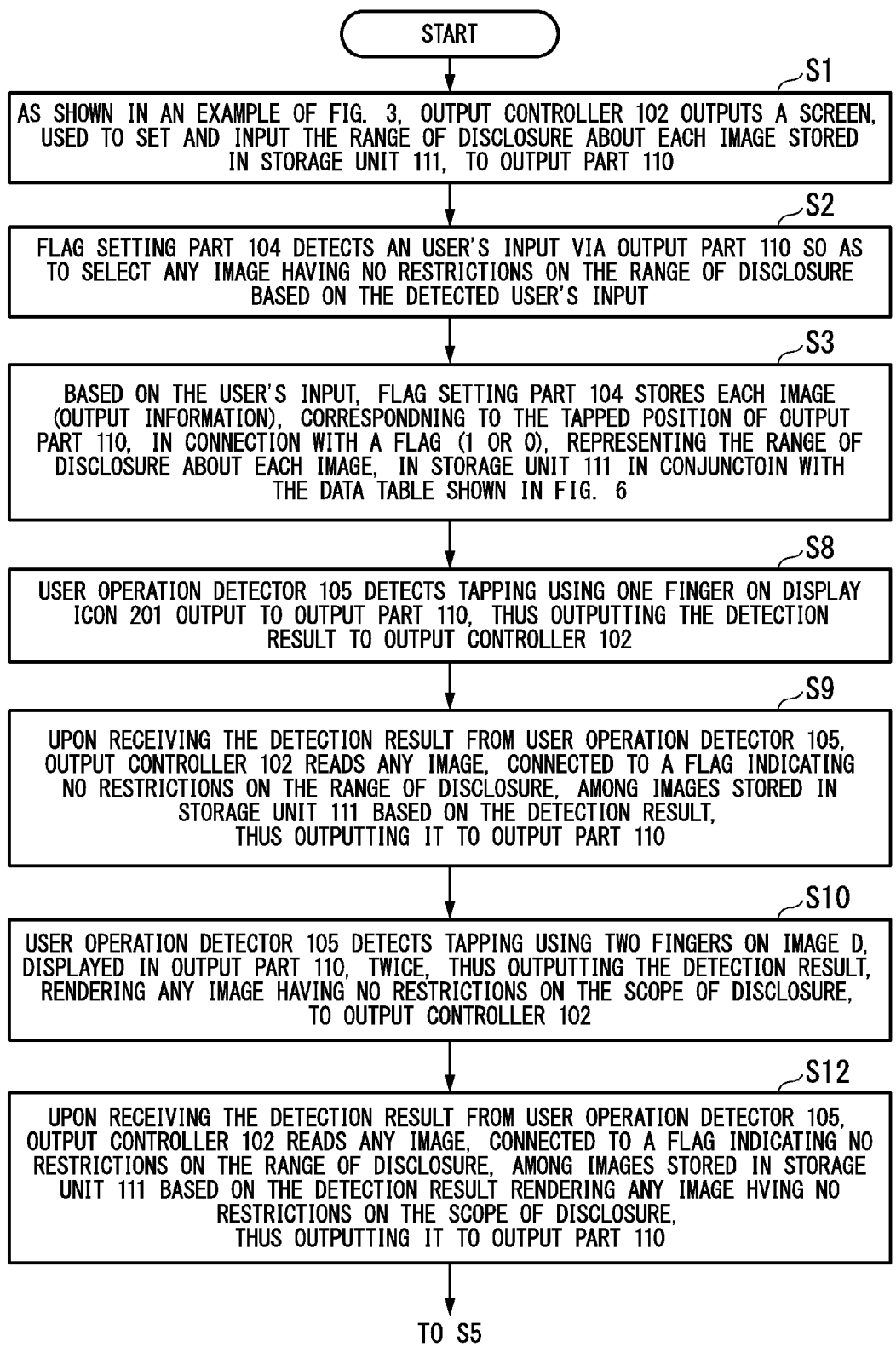
FIG. 10A is a flowchart showing the processing of an information processing device according to the third embodiment of the present invention.
Figure 10B:
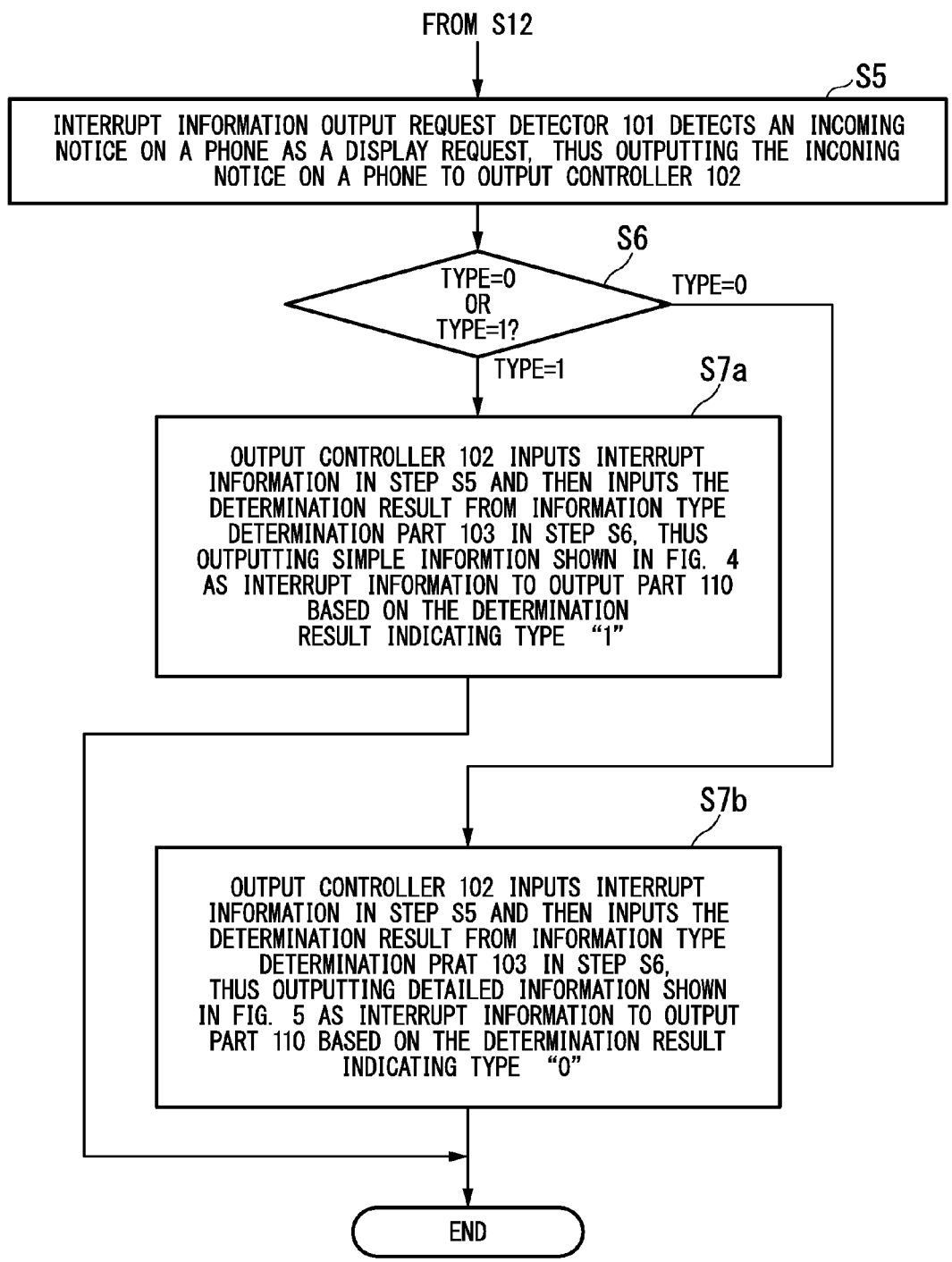
FIG. 10B is a flowchart showing the processing of the information processing device according to the third embodiment of the present invention.

FIGS. 10A and 10B are flowcharts showing the processing flow of the information processing device 10 according to the third embodiment of the present invention.

The processing flow of the information processing device 10 will be described with respect to the case where the information processing device 10 outputs the interrupt information to the output part 110 based on the type of output information. Herein, the processing flow of the information processing device 10 of the third embodiment differs from the processing flow of the information processing device 10 of the second embodiment in terms of step S12. The following description is given with respect to the case where information processing device 10 outputs images as the output information to the output part 110.

Additionally, the information processing device 10 is set to be operated using one finger of each user or one object such as a touch pen when the output information having no restrictions on the range of disclosure is output to the output part 110, but the information processing device 10 is set to be operated using two fingers of each user or two positions of each object when the output information having restrictions on the range of disclosure is output to the output part 110.

First, each user may take images as the output information so as to store those images in the storage unit 111. Alternatively, each user may obtain images, taken by other people except for each user, as the output information so as to store those images in the storage unit 111.

Additionally, it is necessary to establish the setting similar to the setting of steps S1 to S10 in the information processing device 10 of the second embodiment.

Subsequent to step S10, the output controller 102 receives the detection result from the user operation detector 105 and then reads any image, connected to flags indicating restrictions on the range of disclosure, among images stored in the storage unit 111 based on the detection result rendering any image having no restrictions on the scope of disclosure, thus outputting it to the output part 110 (step S12). For example, an assumption is made that the output controller 102 outputs the image D to the output part 110 on the condition that the images B, C, D, F, and G are of types having no restrictions on the range of disclosure on the data table shown in FIG. 6. When each user taps the image D, displayed in the output part 110, twice with two fingers, the output controller 102 reads the image E, connected to a flag "0" indicating restrictions on the range of disclosure, so as to output the image E to the output part 110. Next, when each user taps the image E, displayed in the output part 110, twice with two fingers, the output controller 102 reads the image F, connected to a flag "1" indicting no restrictions on the range of disclosure, so as to output the image F to the output part 110.

When the information processing device 10 receives an incoming call when the output controller 102 outputs the image E, connected to a flag "0" indicating restrictions on the range of disclosure, to the output part 110, the information processing device 10 proceeds to steps S5, S6, and S7 (i.e. S7a and S7b) subsequent to step S12.

In step S8 of the above processing flow, when each user makes a user's input using two fingers, the user operation detector 105 outputs the detection result, rendering any image having restrictions on the scope of disclosure in connection with the output information having restrictions on the range of disclosure, to the output controller 102. Upon receiving the detection result from the user operation detector 105, the output controller 102 reads any image, connected to flags having restrictions on the range of disclosure, among images stored in the storage unit 111 based on the detection result rendering any image having restrictions on the scope of disclosure, thus outputting it to the output part 110.

As described above, the information processing device 10 according to the third embodiment is able to switch an operation as to whether or not to output personal information such as incoming notices based on identifiers currently output with the output part 110 irrespective of the setting of modes.

Additionally, it is possible to display personal information in a non-display mode of personal information by way of the predetermined user's operation.

The present invention has been described heretofore in conjunction with the foregoing embodiments, wherein the information processing device 10 includes a computer system. The foregoing processing is stored in computer-readable storage media in the form of programs, and therefore the foregoing processing is carried out using a computer which reads and executes programs. Herein, computer-readable storage media refer to magnetic disks, magneto-optic disks, CD-ROM, DVD-ROM, semiconductor memory, etc. Additionally, it is possible to deliver computer programs to computers through communication lines, thus allowing computers to execute programs delivered thereto.

The foregoing programs may be drafted to achieve part of the foregoing functions.

Alternatively, the foregoing programs may be differential files (or differential programs) which can be combined with other programs pre-installed in computer systems so as to achieve the foregoing functions.

The present application claims priority based on Japanese Patent Application No. 2013-43820 filed Mar. 6, 2013, the entire content of which is incorporated herein by reference.

REFERENCE SIGNS LIST

10 . . . information processing device
101 . . . interrupt information output request detector
102 . . . output controller
103 . . . information type determination part
104 . . . flag setting part
105 . . . user operation detector
110 . . . output part
111 . . . storage unit
201 . . . display icon

What is claimed is:

1. An information processing device, which includes at least a hardware processor, an output part and a storage unit the information processing device comprising:
   a detector configured to detect an input of interrupt information to be notified to a user watching an image with the output part, wherein the image is selected from among a plurality of images; and
   a controller configured to control the output part upon detecting the interrupt information with the detector to implement one of (i) and (ii):
      (i) controlling of the output part to output simple information as the interrupt information in connection with a first-type image, and
      (ii) controlling of the output part to output detailed information as the interrupt information in connection with a second-type image,
   wherein the controller is further configured to select from the one of (i) and (ii) based on a condition that the storage unit stores a user's setting indicating either the first-type image having no restriction on a range of disclosure or the second-type image having a restriction on the range of disclosure with respect to each of the plurality of images.

2. The information processing device according to claim 1, wherein the simple information is a predetermined message notifying the user of the input of the interrupt information while the detailed information describes a detailed content of the interrupt information.

3. The information processing device according to claim 1, further comprising a flag setting part configured to set a first flag indicating the first-type image or a second flag indicating the second-type image with the output part.

4. The information processing device according to claim 1, wherein the interrupt information indicates an incoming call from an originator, and
wherein the simple information is a predetermined message simply notifying the user of reception of the incoming call while the detailed information describes a detailed content about the originator.

5. The information processing device according to claim 1, further comprising a user operation detector configured to detect a first user operation indicating the first-type image or a second user operation indicating the second-type image with reference to the plurality of images output on the output part.

6. An information processing method adapted to an information processing device including at least a hardware processor, an output part and a storage unit, the information processing method comprising:
storing, on the storage unit, a user's setting indicating either a first-type image having no restriction on a range of disclosure or a second-type image having a restriction on the range of disclosure with respect to each of a plurality of images;
detecting an input of interrupt information to be notified to a user watching an image with the output part wherein the image is selected from among the plurality of images; and
controlling the output part upon detecting the input of the interrupt information to implement one of (i) and (ii):
  (i) controlling of the output part to output simple information as the interrupt information in connection with the first-type image, and
  (ii) controlling of the output part to output detailed information as the interrupt information in connection with the second-type image.

7. The information processing method according to claim 6, wherein the simple information is a predetermined message notifying the user of the input of the interrupt information while the detailed information describes a detailed content of the interrupt information.

8. The information processing method according to claim 6, wherein the interrupt information indicates an incoming call from an originator, and
wherein the simple information is a predetermined message simply notifying the user of reception of the incoming call while the detailed information describes a detailed content about the originator.

9. The information processing method according to claim 6, further comprising detecting a first user operation indicating the first-type image or a second user operation indicating the second-type image with reference to the plurality of images output on the output part.

10. A non-transitory computer-readable storage media having stored thereon a program causing a computer serving as an information processing device to implement an information processing method, the information processing method comprising:
storing a user's setting indicating either a first-type image having no restriction on a range of disclosure or a second-type image having a restriction on the range of disclosure with respect to each of a plurality of images;
detecting an input of interrupt information to be notified to a user watching an image with the output part, wherein the image is selected from among the plurality of images; and
controlling the output part upon detecting the input of the interrupt information to implement one of (i) and (ii):
  (i) controlling of the output part to output simple information as the interrupt information in connection with the first-type image, and
  (ii) controlling of the output part to output detailed information as the interrupt information in connection with the second-type image.

* * * * *